F. PLANT.
Needle Machine.
No. 2,779. Reissued Oct. 15, 1867.
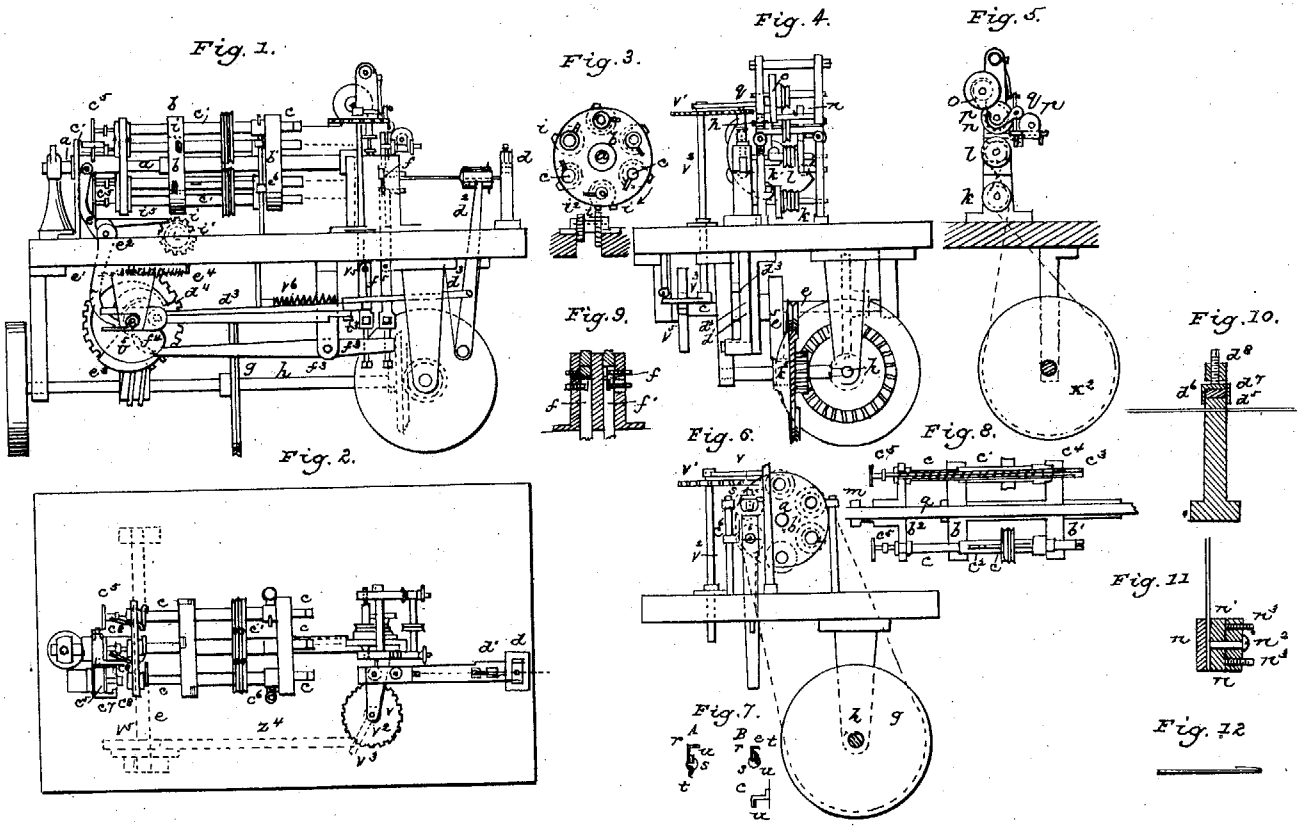
Witnesses:
Inventor:
F. Plant
N. PETERS, Photo-Lithographer, Washington, D. C.

UNITED STATES PATENT OFFICE.

C. P. S. WARDWELL, OF LAKE VILLAGE, NEW HAMPSHIRE, ASSIGNEE, BY MESNE ASSIGNMENTS, OF FREDERIC PLANT.

IMPROVED MACHINE FOR MAKING NEEDLES.

Specification forming part of Letters Patent No. 28,772, dated June 19, 1860; Reissue No. 2,779, dated October 15, 1867.

*To all whom it may concern:*

Be it known that FREDERIC PLANT, of the city, county, and State of New York, has invented a new and useful Machine for the Manufacture of Barbed and other Needles for Knitting and Sewing; and I, C. P. S. WARDWELL, of Lake Village, in the county of Belknap and State of New Hampshire, do hereby declare that the following is a full and exact description thereof, reference being had to the accompanying drawings, making part of this specification—

Figure 1 being a side elevation of the machine; Fig. 2, a plan thereof; Fig. 3, a transverse section of a part of the machine, another part being in elevation; Fig. 4, an end elevation of another part of the machine; Fig. 5, a side elevation of the same part as in Fig. 4; Fig. 6, an endward view, showing portions of the machine in elevation; Fig. 7, views in detail, showing the construction and operation of the barb-bending device; Fig. 8, a diagram indicating, partly in plan and partly in section, the needle holding and moving device; Fig. 9, a vertical section showing the arrangement of the cutting-off device; Fig. 10, a vertical section of the stationary holder; Fig. 11, a horizontal section of the barb flattening or "slabbing" cutter and bed; Fig. 12, a view of a finished bent-barb needle.

Like letters designate corresponding parts in all the figures.

The purposes of this improved machine are to form a needle complete from a wire, feeding in the wire, cutting it off into needle-lengths, punching the eye, grinding or cutting into form, polishing, flattening, and bending or shaping the barb of the needle without removing it or handling it until it is finished; or, in case any of these operations are to be omitted in making different kinds of needles, the remaining operations are performed in like automatic manner by the machine.

In the accompanying drawings I have shown machinery necessary to form a barbed needle, such as is commonly used in knitting machinery and in some kinds of sewing-machines, to exemplify my invention. To make other styles of needles some modifications are or may be necessary; and it is obvious that in many parts of the machine other obvious and well-known mechanical devices may be substituted for the specific ones described without changing the character of the improvements.

The construction of the machine, as represented in the drawings, is as follows:

The frame-work needs no particular description, and is required to be of no particular form.

The first operation to be performed is to feed the wire into the machine. This is done by passing it through a stationary holder of any convenient construction, as at $d$, and thence passing it through a feeding device or apparatus, $d'$, consisting of a grip (or nippers) that slides forward and back, at proper intervals, a sufficient distance to feed in the wire for one needle. When this grip is forced forward, its points approach the line between their pivots, so that it holds the wire and carries into the machine, and in returning its joints recede from the pivot-line, so that it slides over the wire, which is then held from slipping back by the stationary holder $d$. The stationary holder, as more fully represented in Fig. 10, consists of a pressure-block, $d^5$, with an elasitc pad, $d^6$, upon it, and a washer, $d^7$, of metal, over both. A set-screw, $d^8$, presses the whole down upon the wire, which is compressed between the block $d^5$ and the bottom of the opening through the standard in which the device is located. The pressure should be sufficient to prevent the wire from sliding back, as the grip $d'$ begins to recede, till the hold thereof on the wire is released; but it should not be so great as to offer unnecessary resistance to the drawing forward of the wire. This is regulated by the set-screw $d^8$. The feed-motion is obtained by means of a lever, $d^2$, which has its fulcrum at its lower end, its upper end being pivoted to the grip $d'$. A little above its fulcrum the lever is jointed to a connecting-rod, $d^3$, which connects it with an eccentric, $d^4$, on a cam-shaft, $e$, by the revolution of which the lever receives its motion and imparts the proper movement to the grip.

The next operations in the progress of the manufacture are to cut off the wire into needle lengths and to punch or stamp the eye, groove, or recess in the needle piece or blank. These operations may be performed at the same time. The cutting off is effected by a movable shear-blade or edge, $f$, operating in connection with a stationary one, as most clearly illustrated in Fig. 9. The movable shear-blade is on the upper end of a piston or rod, $f'$, which is forced upward by a lever, $f^2$, the fulcrum of which is at $f^3$, Fig. 1, and which is actuated by a cam, $f^4$, on the cam-shaft $e$ in such a manner as to cut off the wire at the proper time. The punching or grooving die $f^5$, Fig. 9, is connected by its rod with the same lever, $f^2$, and is actuated by it at the same time. The punch is forced at the proper moment up against the wire, which is held between it and the bed above. This bed is made adjustable by set-screws, as clearly indicated in Fig. 9. The two connecting-rods, respectively, of the cutting-off blade and punching or grooving die are adjustable to the actuating-lever by screws, as shown, or otherwise.

In order to convey the needle pieces or blanks from the cutting-off and punching or grooving device and hold them in the proper position to receive the subsequent operations, I have represented a peculiar carrier device, as follows: A fixed horizontal shaft or rod, $a$, is secured in a suitable longitudinal position in the machine. On this shaft or rod is mounted a sleeve or tube, to which two disks, $b$ $b'$, are permanently affixed. A third disk, $b^2$, is also placed upon the shaft or rod $a$ in rear of the others, and revolves simultaneously with them upon the said shaft or rod. It also has a longitudinal sliding movement thereon. The disks above named have a series of six or more or less holes through them at equal distances apart and from the centers of the disks, so that all will revolve in equal circles. The number of holes in each disk is determined by the number of distinct operations to be performed upon each needle after the blanks are received by this carrier. These holes form the bearings of a series of parallel tubes, $c$ $c$. Each tube is hollow throughout its length, and passes through a hole in each of the disks, and between the two disks, $b$ $b'$, is surrounded by an exterior tube, $c'$, as indicated in Fig. 8. Each exterior tube, $c'$, has a pulley upon it, by which it is rotated. All the exterior tubes are rotated by a single band running over their respective pulleys and around a driving-pulley, $g$, on a shaft, $h$, in the direction indicated by the arrow in Fig. 6. The tubes and disks also have an intermittent turning or revolving movement together around the central shaft or rod, $a$, and this motion is also effected by the same band that revolves the tubes $c$ $c$ on their own axes. The tendency of this band is to continuously revolve the disks and tubes together unless checked and regulated by some interposing device such as represented, namely: On the periphery of the disk $b$ are projections $i$ $i$, Figs. 1, 2, and 3, which come in contact with projections or cogs on a small wheel, $i'$, placed just below the disk and at right angles thereto. This wheel is on a short shaft, on which is a second cog or ratchet wheel, $i^2$, that is actuated by a catch or pawl, $i^5$, pivoted to a vibratory lever, $e'$. Thus, when any projection $i$ is in contact with a cog or projection on the wheel $i'$, the disks are at rest; but when the cog is moved by the pawl past the projection the disks are set free to move round till the next projection $i$ in order comes in contact with a succeeding cog. In this way the disks are, at each intermittent movement, turned such part of a circle as each successive tube, $c'$, occupies in distance from the preceding. The tubes $c$ $c$ also have a longitudinal sliding or advancing and retreating movement, together with the disk $b^2$, in which the tubes are confined at their rear ends by collars, so that they will move forward and back with, but will turnf reely in, said disk as it slides on the fixed shaft or rod $a$. The advancing of the disk and tubes is effected by the lever $e'$, which is connected by a fork and collar with the said disk. The fulcrum of this lever is at $e^2$, and its lower end is brought into contact with a cam, $e^3$, on the shaft $e$. The tubes and disk are drawn back by a spring, $e^4$, affixed to said lever, or otherwise placed. In each of the exterior tubes, $c'$, there is a longitudinal slot, $c^2$, into which a pin on the corresponding inner tube, $c$, projects, whereby the latter is coupled to the former and is made to turn with it, and yet is free to move forward and backward independent of the same, the slot $c^2$ being long enough to allow the full extent of reciprocating movement required for the inner tube.

In some of the operations the tubes $c$ $c$ are required, for the time, not to turn. This cessation of the revolving motion is effected by a catch or stop in the proper position on the frame, as at $c^6$, against which a projecting pin on each tube $c'$ is brought into contact, so that the band which revolves the tube slips on the pulley for the time. These stops are located in as many and such different positions as are required in the successive operations, as indicated in Fig. 6. The tubes are relieved from the stops by the turning of the disks, which carries them past the same, the tubes yielding freely, by turning on their own axes, to allow the passage.

The tubes $c$ $c$ serve as holders for the needle-blanks while the successive operations required in forming and finishing the needles are going on. To this end each tube is provided with a grasping or clamping device by which to seize and hold the blanks firmly, as follows: The front end of each tube $c$ is occupied in the interior, as clearly indicated in the section, Fig. 8, by a mouth-piece flaring at the outer end, and having a central hole or throat just large enough to admit the needle-blanks freely. In one side of this mouth-piece is a recess, into which is fitted a jaw or piece of metal, $c^3$, which reaches into the central hole of the mouth-piece, and whose rear end is wedge-shaped on its exterior surface. Upon this wedge or inclined surface a sliding wedge, $c^4$, fits, and, when forced forward, acts upon it so as to cause it to grip and hold the wire or needle-blank in the tube. The wedge $c^4$ is connected by a stem extending back through the tube with a button, $c^5$, at the rear thereof. A spring coiled around the stem of the wedge inside of the tube forces the wedge forward and causes it to act to hold the blanks. Each wedge is drawn back in turn, for releasing its needle at the last operation thereon, by the button $c^5$ on its stem passing behind a bent stationary finger or fingers, $c^7$, as most clearly seen in Fig. 2, and, when the tubes advance, being held by said finger or fingers from moving forward with its tube. The needle in this movement is delivered to the device which performs the last operation upon it, such as the barb-bending device, as represented in the drawings, while the carrier recedes without it, so that when that operation upon the needle ceases it is released and drops from the machine. The wedge must still be held drawn back till the carrier next advances and the tube receives a new needle-blank, so that the said blank will enter the clamping mouth-piece freely. This is effected by a trigger or catch, $c^8$, Fig. 2, pivoted to the disk $b^2$, and so arranged as to spring or drop in front of the bottom $c^5$ when the same is held back by the finger or fingers $c^7$. Then, when the blank is fully entered into the mouth-piece, the carrier, still advancing a little farther, brings the heel of the trigger against the disk $b$, thereby moving the trigger away from the button $c^5$ and allowing the spring to drive the wedge forward and clamp the blank.

It will be observed that the blank or needle-carrier advances at each operation, and then recedes to allow it to be turned into the next position, and all the tubes are thus successively brought first to the cutting-off and punching device to receive the blanks, the mouth of each tube being presented exactly to the end of the wire, and then to the several devices for performing the other operations until the needles are finished. Thus there is a different blank or needle receiving one or another operation in each of the clamping-tubes at every forward movement of the carrier, so that one needle is finished each time. When the tube is receiving its blank it is held from revolving by the catch or stop $c^6$, as before specified.

The first operation (as the drawings represent) after the needle-blank is received by the carrier is the first grinding or shaping process. This grinding or pointing of the blank is effected by a steel revolving cutter-disk, $k$, Figs. 2 and 5, or an emery-wheel. The needle is held pressed against the surface of the said cutter-disk or wheel $k$ by a bed-block or gage, $k'$, which is adjusted into exact position by set-screws, Fig. 4, so as to properly bring the wire or blank into contact with the cutting or grinding surface.

In the next operation, as represented, the blank is subjected to a second cutter or grinder, $l$, similar in all essentials to the cutter $k$, but finer, whereby the point is made more perfect and the needle is properly reduced. A similar bed or block also holds the blank to this cutter, as represented in the drawings.

In the next operation the revolution of the carrier-tube is stopped by a catch or step, $m$, Fig. 6, similar to the stop $c^6$, before described. The partly-finished needle is thus thrust forward without revolving, and is ground flat or "slabbed" by the cutter $n$ on the same side as the eye or groove formed in the operation of punching and cutting off. A similar bed or block also holds the needle-bank to this cutter, as to the others before specified.

The construction and arrangement of this flattening or slabbing cutter and its bed or block are more fully shown in Fig. 11, representing a horizontal section thereof in the line of the center of the needle-wire. The bed $n'$ is held in place by a screw, $n^2$, and its two ends are adjusted more or less near to the cutter $n$ by set-screws $n^3$ $n^3$. The form of the barb or flattened portion of the needle is determined by the form of the face of the bed and by its adjustment in relation to the cutters, and it may be varied by said adjustment, which also varies the depths of cut. The bed is therefore a true adjustable pattern to determine the form of the barb of the needle.

At the next step the needle is smoothed and polished by a polishing-wheel, $o$, while revolving. This polishing-wheel acts at its periphery on the needle, which is pressed against the wheel by a spring-rest, $p$, the force of the spring being adjustable by a set-screw, $q$, as shown in Fig. 5.

All the cutting or grinding wheels and the polishing-wheel in the above operations are put in motion by a band running from a pulley, $k^2$, which is driven through bevel-gear by the main shaft $h$. The direction of the band in performing this work is indicated by the red line in Fig. 5.

The final operation (except "tumbling," sometimes employed in the final polish) upon the needle is to bend it into form when a bent barb or hook is to be made thereon. For this purpose the point of the needle is thrust forward to the bending device, which is fully illustrated in diagrams A and B, Fig. 7. The diagram A shows the apparatus open, ready to receive the straight needle, which is inserted along a fixed guide, $r$, as shown by a blue line, and between it and a stationary forming-piece, $u$, around which the barb is to be bent, and thus receive its proper shape. The point projects far enough beyond this forming-piece or die to make the hook or barb. In this position it is situated centrally over a rock-shaft, S, which has a turning movement on its axis of about half a revolution, or sufficient to make the required bend. It has an arm or movable die, $t$, of the proper shape, in the right position to act upon the needle and to bend and bring it round the stationary die $u$, substantially as represented. The diagram B shows the position of the parts after the shaft S is turned and the barb is formed, the blue line representing the needle. The extremity of the die $t$ also makes the proper turn or bend on the point of the barb to enter the eye or groove of the needle. The form of an ordinary machine-bent barb knitting-needle made by the form of bending device represented in the drawings is represented in Fig. 12. To turn the shaft S, a pinion, $v$, is secured upon it, as shown in Figs. 1, 2, 4, and 6, and into this pinion gears a spur-wheel, $v'$, and a shaft, $v^2$, provided with a projecting arm, $v^3$. To this arm a sliding bar, $v^4$, is jointed, and at its other end is moved by a cam, $v^5$, on the cam-shaft $e$. The cam moves the rock-shaft S into position for bending a barb, and a spring, $v^6$, Fig. 6, gives the positive bending movement thereto at the right moment. The cam-shaft $e$ is revolved by a worm or screw, $w$, situated on the driving-shaft $h$ and working into a cog-wheel, $x$, on the said cam-shaft.

It is obvious that many mechanical changes may be made in parts of this machine, such as substituting rotating cutters for the cutter $f$ and die $f^5$. In making needles that are not barbed the bending apparatus is omitted. Gearing, in whole or in part, may be substituted for the bands, and the tubes to be stopped may be thrown out of gear by the usual mechanical devices.

Having thus fully described the said invention of FREDERIC PLANT, what I claim therein as new, and desire to secure by Letters Patent, is—

1. The combination of the traveling nippers or grip and stationary wire-holder or equivalent feeding device, cutting-off shears or device, and eye or groove punch or die, substantially as and for the purposes specified.

2. The combination of the traveling nippers or grip and stationary wire-holder or equivalent feeding device, an eye or groove punch or die, and a tube or tubes, $c$, or equivalent wire or needle-blank holder, substantially as and for the purposes herein set forth.

3. The combination of the traveling nippers or grip and stationary wire-holder or equivalent feeding device, cutting-off shears or device, and one or more tubes or equivalent wire or needle holder, substantially as and for the purposes specified.

4. The combination of one or more tubes or equivalent wire or needle holder and the wire or needle carrier, substantially as herein described, or equivalent device for moving the wire or needle blanks to the action of the operative devices, substantially as and for the purposes herein set forth.

5. The combination of the cutting-off shears or device, eye or groove punch or die, one or both, and wire or needle carrier or equivalent mover, substantially as and for the purposes herein set forth.

6. The combination of the wire or needle carrier or equivalent mover, one or more, pointing or reducing cutters, and a bed or block to keep or rest the needle-blanks against, substantially as and for the purposes herein specified.

7. One or more revolving tubes, $c$ $c$, for holding the needle-blanks or wires, constructed and operating substantially as and for the purposes herein described.

8. The combination of the cutting-off shears or device, eye or groove punch or die, singly or together, and wire or needle carrier or equivalent mover, with the cutting or grinding wheel $n$, for flattening or slabbing the needle wire or blanks, substantially as and for the purposes set forth.

9. The combination of the wire or needle carrier or equivalent mover, the flattening-wheel, and the adjustable bed or block to keep the needle blanks or wires to the flattening-wheel, substantially as and for the purposes set forth.

10. The combination of the wire or needle carrier or equivalent mover, polishing-wheel, and spring-rest, for the purposes specified.

11. The combination of the wire or needle carrier or equivalent mover and the barb-bending mechanism, substantially as herein specified.

12. A combination of mechanical devices, as described, or equivalents thereof, by which needles are automatically made from the wire, either including or not the bending of the barbs and the polishing of the needles.

C. P. S. WARDWELL.

Witnesses:
JOHN B. HENDLEY,
JOHN ALDRICH.